United States Patent [19]
Jane Cabagnero

[11] Patent Number: 5,803,535
[45] Date of Patent: Sep. 8, 1998

[54] SEAT FOR BABY BUGGIES

[75] Inventor: Ramón Jane Cabagnero, Barcelona, Spain

[73] Assignee: Jane, S.A., Barcelona, Spain

[21] Appl. No.: 892,086

[22] Filed: Jul. 14, 1997

[30] Foreign Application Priority Data

Jul. 15, 1996 [ES] Spain ................................. 9602007

[51] Int. Cl.$^6$ .................................................. A47C 4/52
[52] U.S. Cl. ................................ 297/183.3; 297/184.13; 297/488; 297/271.6; 297/354.13
[58] Field of Search ........................... 297/256.16, 250.1, 297/256.1, 256.15, 183.3, 183.2, 183.1, 184.13, 391, 487, 488, 452.34, 452.25, 354.13, 440.1, 271.6, 452.29, 440.14, 423.6, 451.11; 5/416, 655; 280/47.38; 135/88.02

[56] References Cited

U.S. PATENT DOCUMENTS

| 1,217,474 | 2/1917 | MacGowan | 297/184.13 X |
|---|---|---|---|
| 4,371,206 | 2/1983 | Johnson, Jr. | 297/183.3 |
| 4,982,997 | 1/1991 | Knoedler et al. | 297/183.2 X |
| 4,997,231 | 3/1991 | Smith | 297/183.2 X |
| 5,004,253 | 4/1991 | Nakao et al. | 297/488 X |
| 5,074,616 | 12/1991 | Smith | 5/416 X |
| 5,522,639 | 6/1996 | Jaime | 297/184.13 |
| 5,542,746 | 8/1996 | Bujaryn | 297/488 X |
| 5,681,084 | 10/1997 | Yoneda | 297/354.13 X |

FOREIGN PATENT DOCUMENTS

| 3536206 | 4/1987 | Germany | 297/250.1 |
|---|---|---|---|
| 4137599 | 5/1993 | Germany | 297/256.16 |

Primary Examiner—Milton Nelson, Jr.
Attorney, Agent, or Firm—Steinberg & Raskin, P.C.

[57] ABSTRACT

A baby buggy seat including a seat member, a back rest member hingedly coupled to a rear edge of the seat member, a pair of opposed ear flaps coupled to the back rest member, a head rest member coupled to a rear edge of the back rest member, a pair of opposed side arm rests coupled to the seat member, a leg rest coupled to a front edge of the seat member, a substantially U-shaped front handrail coupled to the side arm rests, and a substantially U-shaped handle hingedly coupled to the side arm rests and extendable over the seat member for transporting the seat manually.

18 Claims, 1 Drawing Sheet

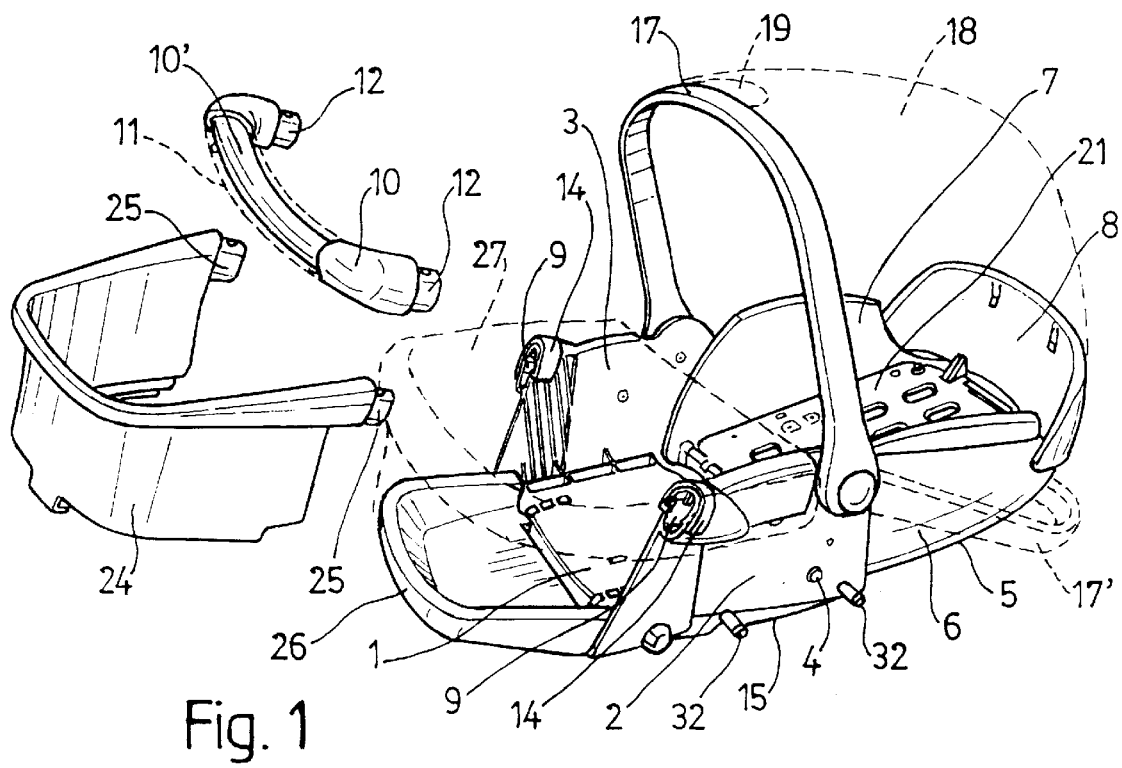
Fig. 1
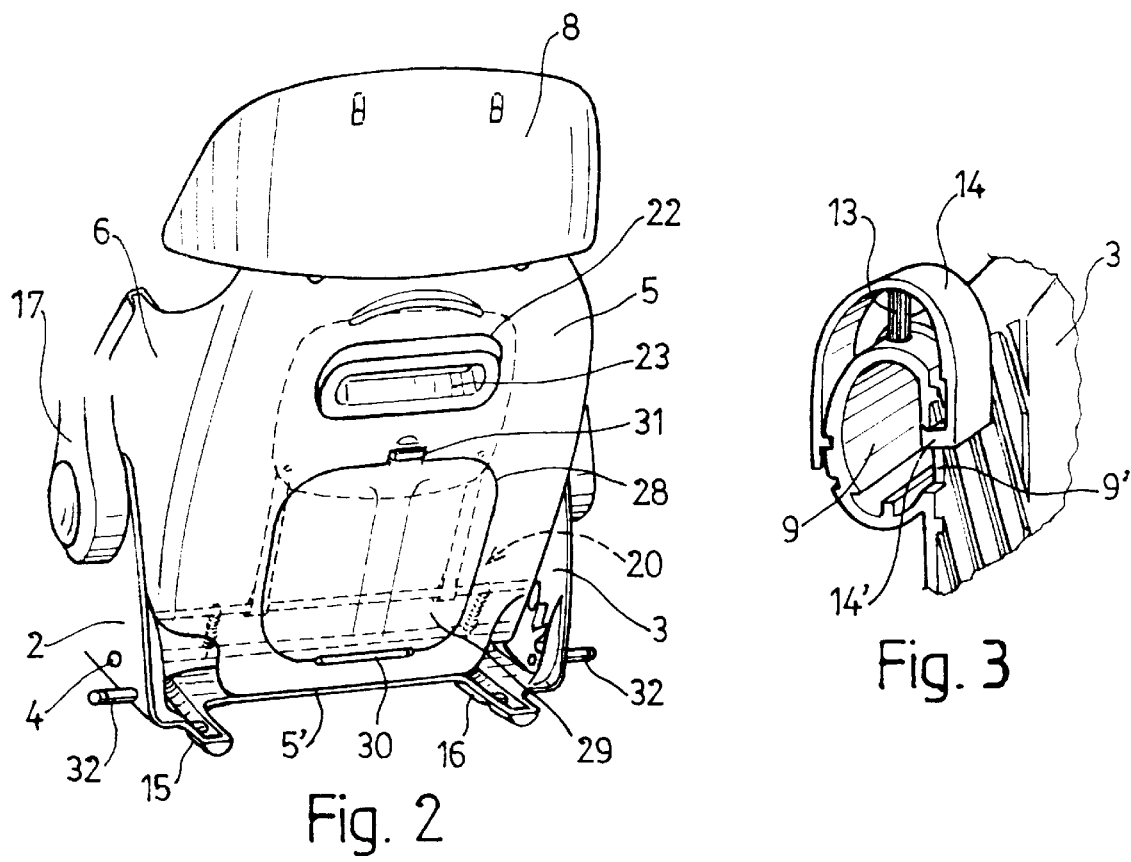
Fig. 2
Fig. 3

SEAT FOR BABY BUGGIES

FIELD OF THE INVENTION

This invention relates to a seat and, more particularly, to a seat for baby buggies, baby strollers or baby carriages.

BACKGROUND OF THE INVENTION

Baby buggies are manufactured in many different manners. For example, the majority of such baby buggies are of the folding version which, when coupled to their frame, form a removable seat. The seat usually consists of two side sections which act as arm rests and between which a seat member is placed. The seat also includes an articulated back rest member which can be inclined at varying degrees until it is practically folded down horizontally. The back rest member is usually provided with an articulated head piece and fixed protective ear flaps and the seat member is provided with a removable front rail and an articulated leg rest.

At the present time, in such an arrangement, both the seat member and the back rest member are formed from plates, each of which are supported by respective frames. The side arm rests are formed from separate pieces of material and are coupled to the seat frame. The ear protectors are also formed from separate pieces of material and are assembled to the back rest frame. The same holds true for the head rest. Further, the front rail is formed from three separate parts hinged to one another.

These prior art seats, however have a number of disadvantages. For example, they are complicated to assemble and produce due to the large number of parts that must be joined together. In addition, several metallic parts are used which require shaping prior to assembly of the seat. This complicated method of assembly and the need for a shaping process increases the seat's cost to consumers.

OBJECTS AND SUMMARY OF THE INVENTION

It is an object of the present invention to provide a new seat for baby buggies that is easy to produce, that is less complicated to assemble, and which has a minimal number of parts.

It is another object of the present invention to create a seat for baby buggies which has an improved finish with few exposed metallic parts and which has a substantially rounded shape.

It is a further object of the present invention to provide a baby buggy seat which can be used as a cradle and which is easy to transport.

To obtain these objects and others, the baby buggy seat in accordance with the invention generally comprises a seat member, a back rest member hingedly coupled to a rear edge of the seat member, a pair of opposed ear flaps coupled to the back rest member, a head rest member coupled to a rear edge of the back rest member, a pair of opposed side arm rests coupled to the seat member, a leg rest coupled to a front edge of the seat member, a substantially U-shaped front handrail coupled to the side arm rests, and a substantially U-shaped handle hingedly coupled to the side arm rests and extendable over the seat member for transporting the seat manually.

In the preferred embodiment of the invention, the handrail facilitates transport when it is in a first position and, furthermore, stabilizes the seat when it is in a second resting position in which the seat is laid on the floor. The seat can also be joined to a base suitable for attachment to a car seat with the aid of safety belts which secure the seat.

In another preferred embodiment of the invention, the seat's main parts are formed from integral pieces of plastic material. For example, it is a feature of the present invention that the seat member and the side arm rests are formed integrally, i.e., from a single piece of plastic, as are the back rest member and ear flaps. It is also a feature of the present invention that the head rest is formed from a single concave piece of material, preferably U-shaped.

The front rail of the seat in accordance with the present invention is preferably formed from a single U-shaped piece of material, its center section being formed in relief and covered by a spongy casing.

In accordance with another embodiment of the present invention, the single piece of material which forms the seat member and side arm rests includes a pair of longitudinal, arched protrusions on its bottom face which enable the seat to function as a cradle.

In another embodiment of the present invention, a hood is provided to the seat of which the handle of the seat forms a small front bow which is joined to the seat.

In other embodiments of the invention, the seat also includes a horizontal U-shaped part which is arranged in the front section of the seat and, in conjunction with the leg rest, converts the seat into a carry cot. It is also characteristic of the present invention that a recess is provided on the rear face of the back rest member that can be closed with a cover and wherein, for example, two feeding bottles can be stored.

BRIEF DESCRIPTION OF THE DRAWINGS

A more complete appreciation of the invention and many of the attendant advantages thereof will be understood by reference to the following detailed description when considered in conjunction with the accompanying drawings, in which:

FIG. 1 is a perspective side view of the seat of the present invention;

FIG. 2 is a perspective rear view of the seat of the present invention; and

FIG. 3 is a perspective view of the pins provided in the mouths of the side arm rests.

DETAILED DESCRIPTION OF THE PREFERRED EMBODIMENTS

Referring to the accompanying drawings wherein the same reference numerals refer to the same or similar elements, FIG. 1 shows the seat of the present invention which includes a seat member 1 and side arm rests 2, 3 joined to the edges of the seat member 1. The seat member 1 and side arm rests 2, 3 are formed from a single piece of plastic material bent in order to form the desired shape. At the rear edge of the seat member 1, a back rest member 5 is coupled via shaft 4. A pair of ear flaps 6, 7 are joined to opposed edges of back rest member 5. Back rest member 5 and ear flaps 6, 7 are also formed from a single piece of plastic material bent in order to form the desired shape. Back rest member 5 is coupled to seat member 1 such that when back rest member 5 is rotated about shaft 4, ear flaps 6, 7 slide within the interior space formed by arm rests 2, 3.

A head rest member 8 is hingedly coupled to back rest member 5 at the upper portion of back rest member 5. Head rest member 8 is formed from a U-shaped concave single piece of material.

At the front upper portion of side arm rests 2, 3, respective mouths 9 are provided as best shown in FIG. 3. A front handrail 10, formed from a substantially U-shaped single piece of material, is also provided which includes at its ends respective trunnions 12. When assembled, front handrail 10 is coupled to side arm rests 2, 3 by inserting trunnions 12 within mouths 9. Holes are formed through each trunnion 12 as well as through the top portion of each mouth 9 such that when the trunnions 12 are retained in the mouths 9, the holes become aligned and pins 13 (FIG. 3) are able to be inserted through the holes thereby securing the handrail to the side arm rests. Arcuate parts 14 are coupled to the side arm rests 2, 3 by means of a side catch 14' which is slidably engageable with an undercut 9' of mouth 9. Arcuate parts 14 are also coupled to pins 13 such that when the arcuate parts 14 are in a raised position, the front handrail 10 can be removed from the seat. On the other hand, when the arcuate parts 14 are in a lowered position, the pins 13 lock the front handrail 10 to the side arm rests 2, 3. Front handrail 10 includes, at its central portion 10', an undercut portion which is covered by a foamy casing 11 (shown in phantom).

On the bottom face of the seat member 1, a pair of arcuate lower side projections 15, 16 are provided which enable the seat to act as a rocking chair (FIG. 2). As such, when the seat is placed on the floor or table, the seat is able to be gently rocked back and forth via the lower side projections 15, 16.

An inverted U-shaped handle 17 is hingedly coupled to the seat via side arm rests 2, 3. In a first position, handle 17 is rotated above the seat and acts as a handle for manually maneuvering the seat. In a second position, handle 17 is rotated around the top portion of back rest member 5 and over head rest 8 to the back of the seat in which position the handle is able to act as a stabilizer for stabilizing the seat when it is resting on the floor or on a table.

In another embodiment of the invention and as shown in phantom lines in FIG. 1, handle 17 forms the front small bow of a hood 18 which is detachably coupled to the seat. The hood 18, at its meeting point with the handle 17, includes an opening 19 to facilitate handling of the seat. This opening may remain closed in use by the construction of the hood 18.

Locking means 20 are provided for locking the hinge of the back rest 5 at several positions. Locking means 20 are arranged on the front side of back rest member 5 and are protected with a plate 21 coupled to the front side of back rest member 5. Back rest member 5 has an opening 22 from which a control 23 for the locking means 20 is exposed. Between the back rest member 5 and the plate 21, a venting chamber is formed which communicates with the outside through a closing grating provided at the lower edge 5' of back rest 5 (not shown).

The seat is also provided with a substantially U-shaped ancillary member 24 formed of a single piece of material which acts to substantially close off the front portion of the seat. Ancillary member 24 is coupled to side arm rests 2, 3 in a similar fashion as discussed above with respect to front handrail 10. More particularly, ancillary member 24 is coupled by means of trunnions 25 which are slidably insertable into mouths 9 of the side arm rests (instead of the front handrail 10). Ancillary member 24 occupies the front space between the side arm rests 2, 3 and bears on a leg rest 26. Ancillary member 24 is preferably complemented by a leg covering 27 (shown in phantom lines) which enables the seat to be converted into a carry cot.

At the rear side of the back rest member 5, a cavity 28 is provided which is able to be closed by cover 29 via a hinge 30 and an upper seal 31. The side arm rests 2, 3 include at their outer/lower portions respective pairs of lugs 32 for use in coupling the seat to a frame or to a base for use with the seat of a car.

All of the single pieces of material shown and referenced above and other parts of the seat are preferably manufactured of suitable molded plastic material. It should be understood though that the seat may be completed with an upholstery and with the accessories deemed most convenient.

The examples provided above are not meant to be exclusive. Many other variations of the present invention would be obvious to those skilled in the art, and are contemplated to be within the scope of the appended claims.

I claim:

1. A seat for baby buggies, including:

a seat member, a back rest member having a front edge hingedly coupled to a rear edge of said seat member, first and second opposed ear flaps coupled to said back rest member, a head rest member coupled to a rear edge of said back rest member, first and second opposed side arm rests coupled to said seat member, a leg rest coupled to a front edge of said seat member, a substantially U-shaped front handrail having a first end coupled to said first side arm rest and a second end coupled to said second side arm rest, and a substantially U-shaped handle having a first end hingedly coupled to said first side arm rest and a second end hingedly coupled to said second side arm rest and being extendable over said seat member for transporting the seat manually.

2. The seat according to claim 1, wherein said head rest is formed from a substantially U-shaped concave piece of material.

3. The seat according to claim 1, wherein said front handrail comprises a foam casing arranged on a portion thereof.

4. The seat according to claim 1, further comprising a pair of elongate arched protrusions arranged on a bottom face of said seat member to enable said seat to rock back and forth.

5. The seat according to claim 1, wherein said handle is structured and arranged to be rotatable about said seat member in order to extend below said seat and rest on the floor in order to stabilize the seat.

6. The seat according to claim 1, further comprising means for locking said back rest member in a desired position, said locking means being arranged on a front face of said back rest member, a control portion for controlling said locking means, and a plate coupled to the front face of said back rest member and having an orifice through which said control portion protrudes.

7. The seat according to claim 1, further comprising an ancillary U-shaped member removably coupled to said arm rests and said leg rest for at least partially covering said leg rest.

8. The seat according to claim 1, wherein said back rest member has a recess formed in its back face and a cover for covering said recess.

9. The seat according to claim 1, wherein said head rest member is hingedly coupled to the rear edge of said back rest member.

10. The seat according to claim 1, wherein said seat member and said side arm rests are formed from an integral piece of material.

11. The seat according to claim 10, wherein said seat member and said side arm rests are formed from plastic.

12. The seat according to claim 1, wherein said back rest member and said ear flaps are formed from an integral piece of material.

13. The seat according to claim 12, wherein said back rest member and said ear flaps are formed from plastic.

14. The seat according to claim 1, wherein said first and second ends of said front handrail are removably coupled to said first and second side arm rests, respectively, and wherein the seat further comprises a trunnion coupled to each end of said front handrail wherein each trunnion has an aperture formed therethrough and wherein each arm rest has a mouth formed therein for receiving a respective one of said trunnions and wherein each mouth has an aperture formed therein which is aligned with the aperture of a respective one of said trunnions.

15. The seat according to claim 14, further comprising a pair of pins which are slidably insertable through the aligning apertures of each mouth and each trunnion in order to lock each trunnion in a respective one of said mouths.

16. The seat according to claim 1, further comprising a hood detachably coupled to said handle.

17. The seat according to claim 16, wherein said hood includes an aperture formed therein to facilitate grasping of said handle.

18. The seat according to claim 16, wherein a portion of said hood rests on said ear flaps and wherein a portion of said hood rests on said head rest member.

\* \* \* \* \*